United States Patent [19]

Dombkowsi et al.

[11] 4,117,670

[45] Oct. 3, 1978

[54] DUAL SLOPE TEMPERATURE DIFFERENTIAL SHUTDOWN CONTROL FOR GAS TURBINES

[75] Inventors: Walter Stephen Dombkowsi, Long Valley; Erwin August Rosin, West Caldwell, both of N.J.

[73] Assignee: Bell Telephone Laboratories Incorporated, Murray Hill, N.J.

[21] Appl. No.: 753,714

[22] Filed: Dec. 23, 1976

[51] Int. Cl.² ............................................. F02C 9/08
[52] U.S. Cl. .............................. 60/39.28 T; 60/223; 328/3; 307/310
[58] Field of Search ................ 60/39.28 T, 39.28 R, 60/223, 39.14; 307/310; 328/3

[56] References Cited

U.S. PATENT DOCUMENTS

| 3,691,405 | 9/1972 | Kendell | 60/39.28 T |
| 3,757,229 | 9/1973 | Murphy | 328/3 |
| 3,834,158 | 9/1974 | Oppmann | 60/39.28 R |
| 3,902,315 | 9/1975 | Martin | 60/39.28 T |

Primary Examiner—Clarence R. Gordon
Attorney, Agent, or Firm—Alfred G. Steinmetz

[57] ABSTRACT

The inlet air temperature and the exhaust gas temperature of a gas turbine power plant are monitored and are utilized as a determining characteristic in a power output stabilization control circuit. The control circuit is designed to change its response upon the attainment of a particular inlet air temperature threshold to conform to differing high and low temperature operating characteristics of the gas turbine power plant.

9 Claims, 4 Drawing Figures

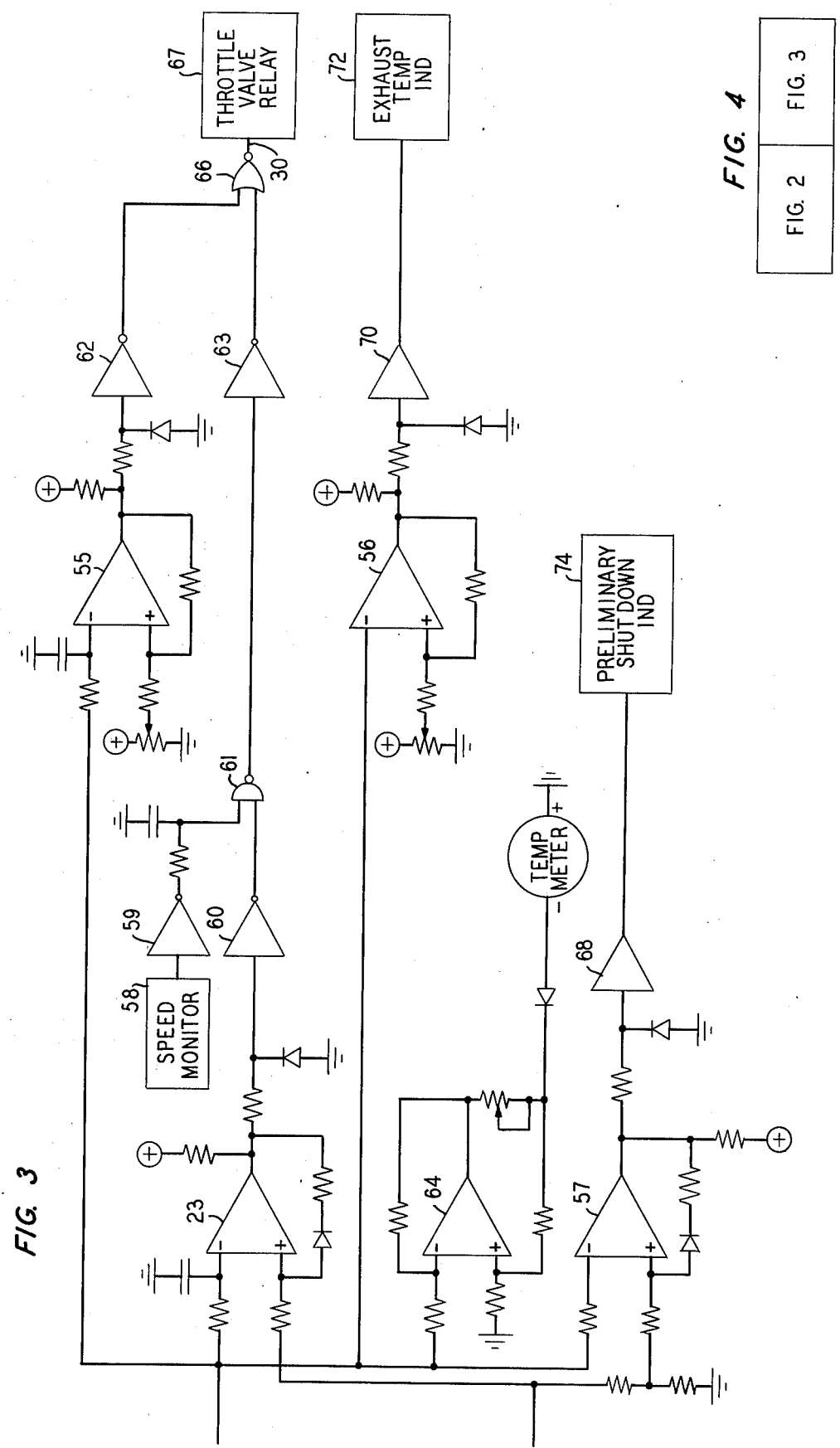

DUAL SLOPE TEMPERATURE DIFFERENTIAL SHUTDOWN CONTROL FOR GAS TURBINES

BACKGROUND OF THE INVENTION

This invention is concerned with operating controls for gas turbine power plants, and, more particularly, is concerned with the power output stabilization of gas turbine power plants. It is specifically concerned with an inlet-exhaust temperature differential responsive control, i.e., a shutdown control, for a gas turbine power plant.

The typical gas turbine power plant comprises a single unit which embodies the functions of a compressor, a combustion chamber, and a working turbine unit. The compressor and working turbine unit are mechanically coupled on a common shaft so that the working turbine rotates the compressor. The common working fluid, air at ambient temperature, is supplied by the surrounding atmosphere. This air is drawn into the compressor when the turbine is operating and is compressed therein to a moderate pressure. The compressor is driven as indicated above by a shaft common to the turbine unit.

The compressed air then passes into the combustion chamber. Fuel is continuously supplied to the combustion chamber and is continuously burned as the compressed air passes through. The compressed air is heated as combustion takes place and a steady stream of high gases is produced. These gases leave the combustion chamber and go into the working turbine unit. The working turbine unit receives the high temperature gases and expands them to convert the thermal energy into mechanical energy at the shaft. The power at the shaft above and beyond that needed to drive the compressor is the net output power of the gas turbine power plant. After the expansion, the hot gases are discharged into the atmosphere.

The power output of the gas turbine power plant is normally controlled by controlling the flow of fuel into the combustion chamber. The power output characteristics of the typical gas turbine power plant described above are in part determined and limited by the temperature differential between the air temperature at the air inlet and the exhaust gas temperature. The power output of a particular turbine is a function of the differential in temperature between the air inlet temperature and the exhaust gas temperature. This temperature differential is also a reflection of mechanical stresses which exist within the gas turbine power plant. The controls of the gas turbine power plant to limit power output and limit mechanical stresses may be designed to operate on measurements of this temperature differential. By constraining the gas turbine power plant to operate within prescribed temperature differential constraints, power output and the integrity of the power plant may be carefully controlled.

The turbine control circuitry based on the inlet-exhaust temperature differential must accurately measure this temperature differential and, furthermore, accurately compare the temperature differential to predetermined operating constraints of the gas turbine power plant. A suitable control system should monitor the temperature differential and respond thereto to control the fuel flow to the gas turbine power plant to maintain its desired operating constraints.

Gas turbine power plants typically do not always have identical temperature differential responsive operating characteristics at different absolute operating temperatures. For example, if the air entering a gas turbine power plant is too low in temperature, the power plant could easily generate power to an extent where it would damage itself mechanically even though the exhaust temperature is within safe limits. Therefore, any control circuit responsive to a temperature differential must establish operating constraints which are compatible with the desired response of the gas turbine power plant at different absolute operating temperatures.

SUMMARY OF THE INVENTION

It is, therefore, an object of the invention to stabilize and limit the power output of a gas turbine power plant.

It is another object to carefully monitor the operating limits of the gas turbine power plant according to preestablished thermal and operating mechanical restraints.

It is yet another object of the invention to establish protection limits to the operation of the gas turbine power plant and define these limits according to an accurate shutdown schedule.

It is a definite object of the invention to limit the shutdown schedule to precisely defined temperature differentials that are related to the power and thermal limits of the operation of the gas turbine power plant.

The principles of the invention are embodied in a temperature differential responsive shutdown control circuit which operates to stabilize and limit the power output of a gas turbine power plant.

A dual slope inlet-exhaust temperature differential transfer characteristic is established to govern the operation of a shutdown circuit controlling fuel flow to the combustion chamber of the gas turbine power plant. This shutdown circuit is responsive to a temperature differential between the temperature of the exhaust gases and the temperature of the inlet air to the compressor of the gas turbine power plant.

This shutdown circuit comprises logic circuitry which is responsive to the exhaust and inlet temperatures monitored by a thermocouple and a temperature responsive resistance, respectively. The dual slope transfer characteristic establishes a maximum permissible exhaust temperature for a range of inlet air temperatures.

The logic circuitry accurately compares a voltage responsive to the exhaust temperature with a voltage responsive to the inlet temperature. If the exhaust temperature exceeds the temperature established by the dual slope transfer characteristic, an output is generated by the logic circuitry. The output of the logic circuitry is applied to control circuitry which controls the fuel input to the combustion chamber in order to control the power limit shutdown circuitry.

The logic circuitry is designed to operate very efficiently and accurately. It utilizes high gain operational amplifiers and current sources which are combined to provide an accurately defined shutdown characteristic. This combination of operational amplifiers works with DC signals generated directly by temperature responsive apparatus. A plurality of accurate current sources combined with the operational amplifier comparator circuits advantageously provide shutdown characteristics which are very accurate and which permit a change in transfer characteristic at an accurately determined break point defined by an inlet air temperature threshold.

BRIEF DESCRIPTION OF THE DRAWINGS

In the drawings:

FIGS. 2 and 3 combined show a block and schematic diagram of a temperature responsive shutdown control which is a more detailed version of that shown in FIG. 1; and FIG. 4 is a diagram showing how to connect FIGS. 2 and 3.

DETAILED DESCRIPTION

Figure 1:
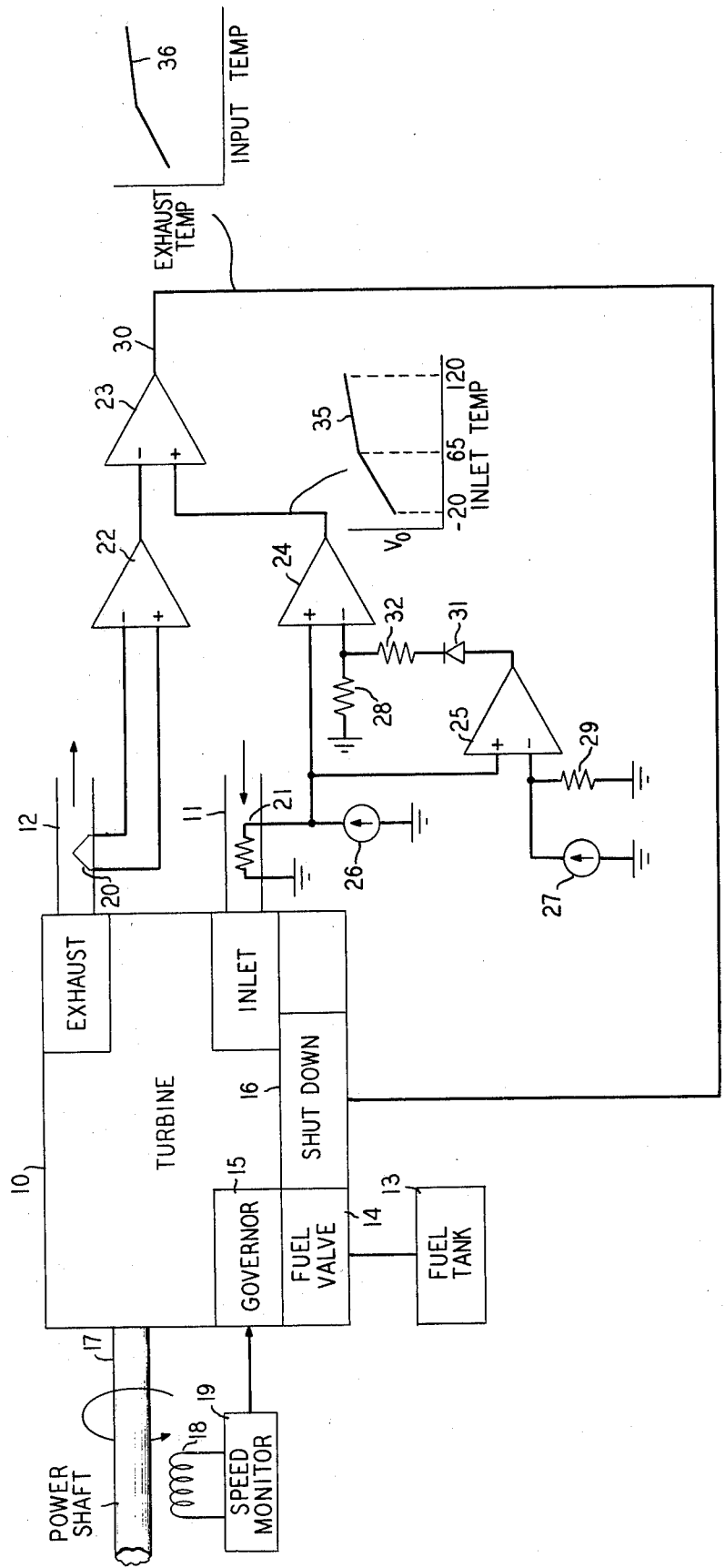
FIG. 1 is a block and partial schematic diagram of a gas turbine power plant and its associated shutdown control circuit.

A gas turbine power plant and its associated temperature responsive shutdown control circuit is shown in FIG. 1. The gas turbine power plant 10 to be controlled includes a compressor, a combustion chamber, and a working turbine. The output power is derived from the power shaft 17. The shaft 17 may include magnetic elements to induce signals in the tachometer winding 18 which is coupled to a tachometer or speed monitor 19. The speed monitor 19 supplies an output signal to a governor 15. This output signal may be electrical or mechanical. The governor responds to the speed monitor 19 to control a fuel valve 14 which controls the fuel input to the combustion chamber of the gas turbine power plant. Fuel is supplied by the fuel tank 13 and flows from the fuel tank through the fuel valve 14 to the combustion chamber. The governor 15 controls this fuel flow by regulating the fuel valve 14 in order to maintain the output speed of the turbine at some predetermined value.

The fuel valve 14 is also responsive to a shutdown activator 16. The shutdown activator 16 is in turn responsive to the temperature responsive shutdown control circuitry which establishes the temperature differential operational limitations of the gas turbine power plant to limit power output and mechanical stress within the power plant. The shutdown activator may comprise any electromechanical device capable of controlling the fuel valve in response to an electrical signal.

Atmospheric air at ambient temperature is supplied to the power plant at air inlet 11. This air would be expected to have an ambient temperature which may range from −20° to +120° Fahrenheit. After combustion the hot gases expand and are exhausted from the power plant at the exhaust orifice 12. It may have a temperature range of anything from 0° to +1600° Fahrenheit. Located in the air inlet 11 to the power plant is a temperature responsive electrical resistance 21. Similarly located in the exhaust orifice 12 is a thermocouple 20. This thermocouple is not limited to but may be a chromel-alumel thermocouple. This thermocouple generates a DC voltage signal in the millivolt magnitude range which is a function of the temperature of the exhaust gases. This DC voltage signal is applied to a high gain operational amplifier 22 to amplify the thermocouple voltage. This minivolt DC signal is applied across the inverting and noninverting inputs of high gain operational amplifier 22. The high gain thermocouple operational amplifier amplifies the millivolt DC voltage to a much higher level to correspond to the voltage range of signals generated in response to the voltage generated across the electrical resistance 21 as described below. The DC output voltage of the high gain operational amplifier 22 is applied to the inverting input of a comparator operational amplifier 23.

The temperature responsive resistance 21 at the air inlet orifice is energized by a constant current source 26. The value of its resistance is a function of the air temperature at the inlet orifice 11 and, hence, the voltage drop across the resistance 21 is a function of the inlet air temperature of the gas turbine power plant. The voltage drop across the resistance 21 is coupled to the noninverting input of a summing operational amplifier 24 and to the noninverting input of a slope change operational amplifier 25.

The slope of response to the DC voltage by the summing operational amplifier 24 or its transfer characteristic is shown by the adjacent voltage to temperature function curve 35. An abrupt transition or break in slope of this curve is shown therein at approximately 65°. This break point is precisely controlled by the slope change amplifier 25.

As indicated above, the voltage across the resistance 21 is coupled to the noninverting input of the slope change amplifier 25. The reference voltage applied to the inverting input is generated by current supplied by a constant current source 27 flowing through a resistance 29. This reference signal is preset so that, when the voltage across resistance 21 is indicative of an inlet temperature of approximately 65° or greater, the slope change amplifier responds to this particular voltage level or above to supply an output signal. This output signal forward biases diode 31 and permits a signal to flow through a voltage divider comprising resistor 28 and resistor 32.

The voltage at the common node of resistors 28 and 32 is a reference voltage supplied to the summing operational amplifier 24. At below 65° no current flows through resistors 32 and 28 from the slope change amplifier 25 and, hence, the summing operational amplifier 24 operates with a first reference or ground reference voltage as shown. When the inlet temperature exceeds 65°, the current flowing through resistors 28 and 32 establishes a second reference voltage thereby changing the signal transfer characteristic of the summing operational amplifier 24.

The output of the summing operational amplifier 24 is applied to the noninverting input of the comparator operational amplifier 23. The comparator operational amplifier 23 operates with its noninverting input functioning as a controlled variable reference responsive to the inlet air temperature. When the voltage of the operational amplifier 22 exceeds the voltage supplied by the operational amplifier 24, the comparator generates a signal output indicative of the over-temperature shutdown condition. The signal output of the comparator 23 is applied, via lead 30, to the shutdown activator 16 which in turn operates to close the fuel valve and shut down the gas turbine power plant.

Figure 2:
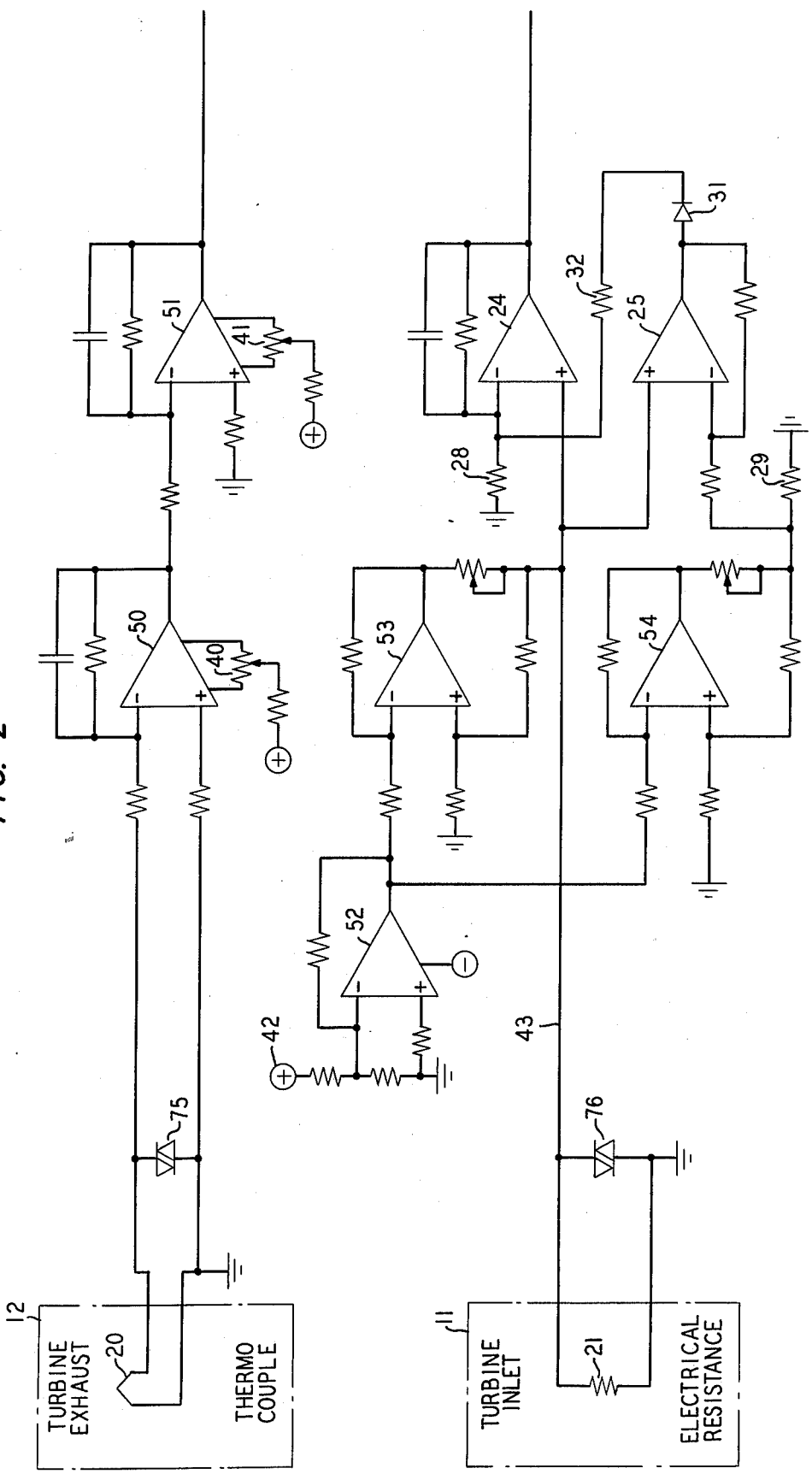

A detailed schematic and block diagram of the temperature responsive shutdown circuit is disclosed in FIGS. 2 and 3, which are positioned together as shown in FIG. 4. The temperature responsive shutdown circuit disclosed therein is a detailed embodiment of the temperature responsive shutdown circuit functionally disclosed in FIG. 1. Circuit elements corresponding to those in FIG. 1 are identified with the same reference numerals. As shown in FIG. 1, the shutdown circuit is connected to an exhaust orifice 12 and an inlet orifice 11 of the gas turbine plant. The circuit includes a chromel-alumel thermocouple 20 which is positioned in the exhaust orifice 12 to monitor the exhaust temperature. The expected range of exhaust temperatures may vary from 0° to 1600° Fahrenheit. Under normal operating conditions the exhaust temperature is typically greater than 850° Fahrenheit. The thermocouple 20 responds to generate a DC voltage which is a function of the exhaust gas temperature. This voltage in the embodiment disclosed has a range from 0 to 35 millivolts DC depending upon the exhaust temperature magnitude.

The shutdown circuit also connects to a temperature responsive electrical resistance 21 located in the inlet orifice 11 advantageously positioned to monitor the inlet air temperature. The resistance of the electrical resistance 21 is a variable which is a function of the inlet air temperature and in the embodiment disclosed this resistance has a range of 80 to 108 ohms depending upon the inlet air temperature which may vary from $-20°$ to $+120°$ Fahrenheit. The electrical resistance 21 is energized by a constant current source as described below and the voltage drop thereacross in the example has a range of 0.4402 to 0.594 volts DC depending upon the air temperature.

The electrical voltage information derived from these two monitoring devices is compared to predetermined signal limits set by the shutdown control circuit. If the conditions of operation as predetermined by these limits are exceeded, the shutdown circuit generates a shutdown signal to shut down the gas turbine power plant.

The voltage generated by the thermocouple 20 is applied to the inverting input of a high gain operational amplifier 50. A ground or reference potential is coupled to the noninverting input of the high gain operational amplifier 50. A varistor 75 is shunted across the input to the high gain operational amplifier 50 and functions as a clamping device to protect the input to the high gain operational amplifier should a ground fault occur at the input terminal. The output of the high gain operational amplifier 50, which is a function of the exhaust gas temperature, is applied to the inverting input of a subsequent high gain operational amplifier 51. The two cascaded high gain operational amplifiers 50 and 51 functionally correspond to the high gain operational amplifier 22 disclosed in FIG. 1.

The high gain operational amplifiers 50 and 51 each have an adjustment potentiometer 40 and 41, respectively. These potentiometers are used as an offset null adjustment to calibrate the operational amplifiers for zero output in the absence of an input signal. The two high gain operational amplifiers 50 and 51 multiply the DC millivolt signal supplied by the thermocouple 20 by at least an order of magnitude to a higher value. The DC voltage output of the high gain operational amplifier 51 is applied in parallel to the inverting input of five comparator operational amplifier circuits 23, 57, 55, 56, and 64. This DC voltage is a function of the absolute exhaust gas temperature. The comparator operational amplifier circuits 23 and 57 are utilized to respond to a temperature differential between the inlet air and exhaust gas temperatures and their operation will be disclosed first. The comparator operational amplifiers 55, 56, and 64 respond to absolute exhaust temperatures as discussed below.

The two comparator operational amplifier circuits 23 and 57 each have reference signals related to the inlet air temperature applied to the noninverting input. These reference voltages or signals are supplied to both comparator circuits by the output of a single summing operational amplifier 24 whose output is determined by the air inlet temperature as described below. The reference voltage or signal applied to the comparator operational amplifier 57 is a function of but less than the reference voltage applied to the noninverting input of the comparator operational amplifier 23. The reference voltage or signal is applied directly through a resistor to the comparator operational amplifier 23 whereas the reference voltage or signal is applied via a voltage divider to the noninverting input of the comparator operational amplifier 57. In the embodiment disclosed, the reference voltage applied to comparator operational amplifier 57 is considered to be approximately 90 percent of the reference signal applied to the comparator operational amplifier 23. These reference signals are responsive to the actual value of the inlet air temperature and are variable as determined by circuitry described hereinbelow to achieve desired temperature differential characteristics above and below some predetermined inlet temperature break point.

As described hereinabove, the electrical resistance 21 is energized by a constant current source. This constant current is derived from a stable voltage source identified by reference numeral 42. All positive voltages shown in FIGS. 2 and 3 by the positive indication within a small circle are derived from the same source and in the embodiment disclosed are supplied by a stable 12 volt DC source. The DC voltage of source 42 is applied to a voltage divider coupled to the two input terminals of operational amplifier 52 connected as a voltage regulator and polarity inverter circuit. The output voltage of the polarity inverter 52 is a stable $-6$ volts and is applied to the inverting input of operational amplifier 53. The stable $-6$ volt supply is derived from an unregulated $-12$ volt source that is shown as the negative supply input to operational amplifier 52. The $-12$ volt source is also used as the negative supply input to all operational amplifiers and comparators. The operational amplifier 53 is connected as a voltage-to-current converter and in view of the stable input voltage supplies an essentially constant current at its output. The constant current output of operational amplifier 53 flows via lead 43 through the temperature responsive electrical resistance 21 to ground. A varistor 76 couples lead 43 to ground and functions as a clamp to protect the input of the operational amplifiers 24 and 25 should a ground fault occur. As described hereinabove, the voltage drop across the electrical resistance 21 is a function of the air temperature at the inlet orifice 11. The voltage generated in response to the constant current flow through the impedance of resistor 21 is applied to the noninverting input of a summing operational amplifier 24. A reference signal is applied to the inverting input of the summing operational amplifier 24. This reference signal is variable and depends on the actual inlet air temperature being above or below the preselected temperature threshold.

As is apparent from FIG. 2, the reference supplied to the inverting input of the summing operational amplifier 24 will either be ground potential or will be a signal supplied by the output of the slope change operational amplifier 25. As described below, the slope change operational amplifier 25 supplies a signal to the inverting input of the summing operational amplifier 24 when the inlet air temperature exceeds a certain threshold temperature. In the particular embodiment disclosed herein, this threshold temperature is assumed to be 65°.

The signal output of operational amplifier 52 is also applied to an operational amplifier voltage-to-current converter 54. This supplies a constant current to energize a precision close tolerance resistor 29. The constant voltage generated across resistor 29 acts as a reference voltage and is applied to an inverting input of the slope change amplifier 25. This establishes an electrical signal level which must be exceeded by the voltage drop across the resistor 21 to cause the slope change operational amplifier 25 to provide an output signal. When the input signal to the noninverting input of the slope change amplifier 25 exceeds the reference voltage applied to the inverting input, the output of slope change operational amplifier 25 changes state. The signal represented by this changed state forward biases diode 31 and allows current to flow through the series connected resistors 28 and 32. The voltage at the junction of resistors 28 and 32 becomes the new reference signal applied to the inverting input of the summing operational amplifier 24.

The reference signal output of the summing operational amplifier 24 is applied in parallel to the noninverting inputs of the comparator operational amplifiers 23 and 57. Here the voltage level responsive to the inlet air temperature supplies the reference signals by which the operating limits of the exhaust temperature are judged.

As described above, the output of the high gain operational amplifier 51 is applied to the comparators 23 and 57. The primary shutdown activation control is operated in response to the output signal of the operational amplifier 23. When the exhaust temperature responsive electrical signal exceeds the reference voltage signal responsive to the inlet air temperature, the output of the operational amplifier 23 changes state. The signal representing this changed state is applied to a buffer amplifier 60 and from thence to a NAND gate 61. The output of NAND gate 61 is applied via a buffer amplifier 63, a NOR gate 66, and lead 30 to a throttle valve relay 67 which responds to a signal to cut off the fuel flow to the combustion chamber of the gas turbine power plant.

The NAND gate 61 is enabled in response to a speed monitor circuit 58. The speed monitor circuit 58 operates to determine when the rotational speed of the turbine has reached some predetermined threshold value. It may be coupled directly to the turbine shaft or through the speed monitor 19 shown in FIG. 1. Its purpose is to prevent the activation of this particular temperature differential shutdown function before a certain rotational speed has been attained. Once this speed threshold has been attained, the speed monitor 58 applies a signal, via buffer amplifier 59, to enable the NAND gate 61. The output of the comparator 23 is applied, as described above, through enabled NAND gate 61, the buffer amplifier 63, NOR gate 66, and output lead 30 to a throttle valve relay 67 which operates to cut off fuel from the combustion chamber of the gas turbine power plant. The throttle valve relay 67 may be included in the shutdown activator 16 shown in FIG. 1.

The purpose of making this temperature differential shutdown control conditionally responsive to the attainment of a predetermined speed threshold is to assure that at the start-up of the gas turbine power plant shutdown is a function only of the absolute exhaust temperature.

The comparator operational amplifier 57 also operates in response to a temperature differential. However, the reference signal applied to its noninverting input is reduced slightly in magnitude from the reference signal applied to the comparator operational amplifier 23. In the disclosed embodiment, the reduction is on the order of ten percent. The purpose of this comparison to a reduced reference is to activate an indicator device 74 to alert maintenance personnel to the fact that an operating differential temperature condition is about to be reached at which shutdown is imminent. The output of the comparator operational amplifier 57 is applied via a buffer amplifier 68 to a preliminary shutdown indicator 74 which may comprise any suitable indicating device.

As indicated by the drawing, the output of the high gain operational amplifier 51 is utilized to operate control functions which are responsive only to the absolute exhaust gas temperature. Accordingly, the signal output of the high gain operational amplifier 51 is applied in parallel to the operational amplifiers 55, 56, and 64.

The output of comparator operational amplifier 51 is connected to the voltage-to-current converter operational amplifier 64 which in turn has its output coupled to a temperature meter. The current output proportionately deflects the meter to give an indication of the actual exhaust gas temperature of the gas turbine power plant.

The output of operational amplifier 51 is applied to the comparator operational amplifier 56 and causes the output of the operational amplifier 56 to change state at a predetermined signal level representing a predetermined exhaust gas temperature. The output of the operational amplifier 56 is applied via a buffer amplifier 70 to operate an exhaust temperature threshold indicator 72 which indicates that some preliminary exhaust temperature indicative of stable operation has been reached.

The signal output of the high gain operational amplifier 51 is also applied to a comparator operational amplifier 55. This is preset to respond to an exhaust gas temperature threshold at which start-up is unsafe. The output of the operational amplifier 55 is applied via an inverting buffer amplifier 62, NOR gate 66, and lead 30 to the throttle valve relay 67 and is utilized to assure that the gas turbine is inoperative if the absolute exhaust gas temperature is above a predetermined threshold temperature irregardless of the existing temperature differential.

What is claimed is:

1. A temperature differential responsive control circuit comprising, first sensor means for deriving a signal responsive to a first temperature level, second sensor means for deriving a signal responsive to a second temperature level, temperature responsive signal generation means coupled to said second sensor means and including means for controlling a temperature responsive signal amplitude function comprising threshold responsive means having an input coupled to said second sensor means and a variable reference signal source means responding to a signal output of said threshold responsive means and coupled to an input of said temperature responsive signal generation means, said temperature responsive signal generation means responding to said variable reference signal source means to establish a first temperature responsive signal amplitude function output below a predetermined threshold and establish a second temperature responsive signal amplitude function output above a predetermined threshold, comparator means, having first and second inputs, said first sensor means and an output of said temperature responsive signal generation means being coupled to said first and second inputs of said comparator means, respectively, and means coupled to an output of said comparator means for responding to a predetermined temperature differential as defined by said comparator.

2. A temperature differential responsive control circuit as defined in claim 1 wherein said threshold responsive means comprises an operational amplifier including a fixed reference signal coupled to its inverting input and having its noninverting input coupled to said second sensor means and said variable reference signal means comprising a voltage divider comprising first and second impedance coupling an output of said threshold responsive means to ground, a junction intermediate said first and second impedances being coupled to an input of said temperature responsive signal generation means as a reference input.

3. A temperature differential responsive control circuit as defined in claim 2 wherein said first sensor means comprises a thermocouple voltage source to generate a voltage representative of a first temperature level and said second sensor means comprises a temperature responsive electrical impedance and a second current source coupled to energize said temperature responsive electrical impedance to generate a voltage signal representative of a second temperature.

4. A gas turbine power plant shutdown control comprising,
first temperature sensing means for generating a DC voltage as a function of an exhaust gas temperature of said power plant,
second temperature sensing means for providing an electrical resistance as a function of an inlet air temperature of said power plant,
a first constant current source coupled for supplying current to said second temperature sensing means,
a summing operational amplifier,
a slope change operational amplifier,
said second temperature sensing means coupled to noninverting inputs of said summing operational amplifier and said slope change operational amplifier,
a first reference signal source applying a first reference voltage coupled to an inverting input of said slope change operational amplifier,
a second reference signal source coupled to an inverting input of said summing operational amplifier, said second reference signal source responsive to the output of said slope change control operational amplifier to provide first and second fixed reference voltages,
a comparator operational amplifier,
said first temperature sensing means coupled to a first input of said comparator operational amplifier,
an output of said summing operational amplifier being coupled to a second input of said comparator operational amplifier,
shutdown means for shutting down the power plant, and
said comparator operational amplifier having an output coupled to actuate said shutdown means.

5. A gas turbine power plant shutdown control as defined in claim 4 wherein said first temperature sensing means includes a thermocouple to generate a heat responsive DC voltage and at least a high gain operational amplifier coupling said DC voltage to said comparator operational amplifier.

6. A gas turbine power plant shutdown control as defined in claim 4 wherein said second reference signal source comprises a voltage divider including first and second impedances connected in series and coupling the output of said slope change control operational amplifier to ground, a node at a junction of said first and second impedances being connected to an inverting input of said summing operational amplifier.

7. A power output stabilization control for a turbine comprising
a thermocouple located to sense an exhaust gas temperature of said turbine,
a thermocouple amplifier to generate a voltage responsive to said thermocouple and representative of the exhaust gas temperature,
a temperature responsive resistance having an impedance that is a function of its temperature and located to sense an inlet air temperature of said turbine,
a first constant current source connected to energize said temperature responsive resistance,
a summing amplifier having a first and second input, said temperature responsive resistance coupled to the first input of said summing amplifier, a reference resistor coupled to said second input to establish a reference signal thereat,
a slope change amplifier having a first and second input and biased to generate one of two signals of opposite polarity in response to preselected inputs, said temperature responsive resistance connected to said first input of said slope change amplifier,
a second constant current source, a second resistor energized by said second constant current source,
a terminal of said second resistor being connected to said second input of said slope change amplifier,
a unidirectional conducting device coupling the dual polarity output of said slope change amplifier to the second input of said summing amplifier and said unidirectional conductive device operative at a preselected temperature of said temperature responsive resistance to change the reference signal at the second input of said summing amplifier,
a comparator circuit,
the output of said summing amplifier and said thermocouple amplifier being applied to said comparator circuit, and
shutdown circuitry responsive to said comparator circuit to turn off said turbine.

8. A power output stabilization control as defined in claim 7 further including first and second clamping means shunting said thermocouple and temperature responsive resistors, respectively, to protect said thermocouple amplifier, said summing amplifier and said slope change amplifier.

9. A power output stabilization control as defined in claim 7 further including gating means coupling the output of said comparator means to said shutdown circuitry,
a speed monitor to respond to the attainment of a predetermined threshold speed by said turbine and including an output coupled to enable transmission through said gating means.

* * * * *